United States Patent [19]

Jenne

[11] Patent Number: 5,393,592
[45] Date of Patent: Feb. 28, 1995

[54] HEAT-SEALABLE PLASTIC FILM

[75] Inventor: Helmut Jenne, Schriesheim, Germany

[73] Assignee: BASF Aktiengesellschaft, Ludwigshafen, Germany

[21] Appl. No.: 3,939

[22] Filed: Jan. 19, 1993

Related U.S. Application Data

[63] Continuation of Ser. No. 537,697, Jun. 14, 1990, abandoned.

[30] Foreign Application Priority Data

Jul. 1, 1989 [DE] Germany ............... 3921677

[51] Int. Cl.⁶ ............ B32B 27/08; B32B 27/34; B32B 27/36; B32B 31/30
[52] U.S. Cl. ............ 428/213; 428/349; 428/475.8; 428/476.1; 428/483; 428/517; 428/521
[58] Field of Search ............ 428/213, 349, 475.8, 428/476.1, 483, 517, 521

[56] References Cited

U.S. PATENT DOCUMENTS

| | | | |
|---|---|---|---|
| 4,339,502 | 7/1982 | Gerry et al. | 428/411 |
| 4,769,261 | 9/1988 | Hazelton et al. | 428/35 |
| 4,803,102 | 2/1989 | Raniere et al. | 428/35.2 |
| 5,221,136 | 6/1993 | Hauck et al. | 312/406 |

FOREIGN PATENT DOCUMENTS

| | | |
|---|---|---|
| 1084919 | 7/1960 | Germany . |
| 1420698 | 10/1968 | Germany . |
| 1934348 | 1/1970 | Germany . |
| 1645406 | 5/1970 | Germany . |
| 1959922 | 7/1971 | Germany . |
| 2550227 | 5/1977 | Germany . |
| 3030364 | 3/1981 | Germany . |
| 3531036 | 3/1987 | Germany . |
| 2029766 | 3/1980 | United Kingdom . |

*Primary Examiner*—D. S. Nakarani
*Attorney, Agent, or Firm*—Oblon, Spivak, McClelland, Maier & Neustadt

[57] ABSTRACT

A heat-sealable plastic film produced by coextrusion or lamination, comprising 2 layers A and C and, if desired, a layer B and, if desired, a layer of an adhesion promoter for bonding each two of the layers A, B (if present) and C (the sum of the thicknesses or of the weights of A, B (if present) and C in each case being 100) comprises from 1 to 50 % of a layer of a heat-sealable, impact resistant polystyrene A, up to 95% of a base layer B and from 1 to 99% by weight of a high-melting plastic layer C.

3 Claims, No Drawings

HEAT-SEALABLE PLASTIC FILM

This application is a continuation of application Ser. No. 07/537,697, filed on Jun. 14, 1990, now abandoned.

BACKGROUND OF THE INVENTION

1. Field of the Invention

The invention relates to a heat-sealable plastic film having a heat-sealable coating of a thermoplastic polystyrene resin.

2. Description of the Background

Plastic containers for the packaging of foodstuffs must in many cases be sealed in an air-tight manner in order to ensure their shelf lives. The seals used in many cases, in particular in the packaging of dairy products, are aluminum foils coated with a heat-sealable composition, which ensures adequate adhesion to a wide variety of plastic containers. Since aluminum is insensitive to heat, the heat-sealing operation can be carried out at any desired temperature. It need only be ensured that the seal is of sufficient quality that, on the one hand, the container is sufficiently tightly sealed, ie., for example, does not burst when dropped, but, on the other hand, can still easily be opened by hand without the foil tearing. It is important here that the seal satisfies this strength requirement over a certain processing range, as required by commercially available sealing equipment.

In addition to aluminum foils, plastic films with a heat-sealable coating are also used. The particular heat-sealable coating depends on the type of plastic from which the container to be sealed is produced. Thus, an acrylate resin-based coating with additives for regulating the adhesive strength and the melting point is applied, for example, to the hard PVC heat-sealable films most commonly used for this purpose.

In contrast to aluminum foils, heat-sealable plastic films can also be subjected to thermoforming. Shaped lids produced from plastic films can thus also be heat-sealed to the container to be sealed, but are suitable for re-sealing the package after removal of some of the contents.

However, the PVC heat-sealable films currently used have some disadvantages; they are relatively expensive, since they must be provided with a heat-sealable coating, and the residual solvent originating from the coating can only be removed from the plastic using considerable effort. In addition, environmental considerations increasingly mean that PVC is being replaced by other thermoplastics in disposable packages.

DE-A 3,531,036 describes plastic films which can be produced by coextrusion and have a heat-sealable coating comprising an impact resistant polystyrene, a block copolymer and a lubricant.

Films made from amorphous polyethylene terephthalate with a heat-sealable coating have also been disclosed. All these heat-sealable plastic films must be provided with a thin heat-stable protective coating on the side facing the sealer unit in order to prevent adhesion of the plastic film to the sealer jaws.

It has become apparent that a significantly narrower processing latitude is available for use of all heat-sealable plastic films compared with aluminum foils; if the sealing temperature and time are inadequate, the plastic film does not permit sufficient heat transmission, and adhesion of the film does not take place. However, if the sealing temperature and time are excessive, the plastic film melts and runs away under the pressure necessary for sealing. It then becomes so thin in the sealing area that it tears when only a small force is applied, and satisfactory opening and re-sealing of the package is no longer possible. Between these two extremes, there is, for all these heat-sealable plastic films, usually only a narrow range of from 10° to 20° C. which must be reliably observed in order to ensure trouble-free production and satisfactory use of the sealed package. Practical experience has shown that this is possible in a number of cases; however, particularly in filling plants in which several pots are sealed simultaneously, sufficiently reliable temperature control is not always ensured since temperature differences of 20° C. and more are no exception between the various cavities.

SUMMARY OF THE INVENTION

It is therefore an object of the present invention to develop a heat-sealable plastic film which contains, as heat-sealable coating, a molding composition corresponding to DE-A 3,531,036, ie. which can be produced by coextrusion and whose heat-sealable coating is thus free from solvents, but in which the processing latitude and thus the processing reliability are significantly increased by other measures. In addition, films of this type should, for example, satisfy the requirement that they facilitate satisfactory production even in filling plants where pots filled simultaneously in several cavities are sealed. Since the processing temperature range cannot be extended downward due to the low thermal conductivity of plastic films, this means that suitable measures must be taken to ensure that satisfactory sealing and also problem-free behavior of the sealed package in use are ensured, even at relatively high sealing temperatures.

A further disadvantage of the currently used heat-sealable plastic films mentioned is the necessity of preventing adhesion of the plastic film to the sealer jaws by applying a protective coating. This means that the film must be passed through a coater, which represents a significant cost factor. It was thus a further object of the present invention to produce a heat-sealable film by coextrusion without any further subsequent coating steps, ie. it is merely necessary to print the finished heat-sealable lids if required.

We have found that these objects are achieved by the heat-sealable plastic films produced in accordance with DE-A 3,531,036, which satisfy these requirements in an excellent manner if they are provided with a thin plastic coating having a high melting point.

Accordingly, the invention directly provides a heat-sealable plastic film produced by coextrusion or lamination, and preferably containing 3 layers A, B and C, but at least 2 layers A and C, and, if desired, at least one further layer of an adhesion promoter D, which is intended to ensure the bonding between each two of the layers A, B and C, where the sum of A, B (if present) and C can be related to the thickness or weight and is in each case 100, and which comprises from 1 to 50% of a layer of a heat-sealable, impact resistant polystyrene A, up to 95% of a base layer B and from 1 to 99% of a high-melting plastic layer C.

The high-melting layer C can be applied, as stated, by lamination or by coextrusion in one operation together with the production of the heat-sealable plastic film. This avoids applying a protective coating in a subsequent operation, and it has been shown, unexpectedly, that a plastic layer of this type also prevents the low-melting main layer of the heat-sealable plastic film running off even at very high sealing temperatures, in contrast to the current process, in which a protective coating is applied.

The result of this is that these heat-sealable plastic films according to the invention can be used in virtually the same way and in the same filling plants as heat-sealable aluminum foils without tedious modifications to the filling plants being necessary. The significant barriers to the range of applications of heat-sealable plastic films of this type in industry are thus removed. The advantages of the plastic films produced by this process over those used hitherto are thus the problem-free processing and use and the avoidance of subsequent applications of a heat-sealing coating and the avoidance of hard-to-remove solvents. The advantages over heat-sealable aluminum foils are the much lower energy consumption for production, the possibility of re-sealing used packages by means of thermoformed, heat-sealable plastic lids, the better print quality and the avoidance of solvents and their attendant removal.

However, it may in some cases be necessary to protect the print with a protective coating in the area of the seal. It may also be necessary, particularly in the case of additional plastic layers having a melting point of below 250° C., to further improve the processing latitude by means of a coating of this type.

The structure of the plastic film according to the invention involves components A, if desired B, and C. The film preferably comprises 3 components in the following proportions, based on the thickness or weight of the plastic film comprising A, B and C:

Component A: from 1 to 50%, preferably from 3 to 30% and in particular from 3 to 15%

Component B: up to 95%, preferably from 50 to 90% and in particular from 60 to 90%

Component C: from 1 to 99%, preferably from 1 to 30% and in particular from 5 to 15%

The plastic film may also contain adhesion promoters D, which ensure strong bonding of layers A, B and C to one another; their amount is only small compared with A, B and C.

Materials which are known per se and are generally also commercially available can be used for each of components A, B (if present), C and the adhesion promoters D (if present) of the plastic film according to the invention.

DESCRIPTION OF THE PREFERRED EMBODIMENTS

Component A

Component A in the plastic film according to the invention has the particular property of being heat-sealable. It is therefore used in the broadest sense in the production of composites having a base, in particular, a base film.

Suitable materials for component A in the plastic film according to the invention are in particular molding compositions as described in DE-A-3,531,036. Apart from additives such as stabilizers, these molding compositions comprise 3 constituents; the essential constituent (component A1) is impact-resistant polystyrene (for the purposes of the invention, this is two-phase polystyrene comprising a resin matrix and a soft phase).

The resin matrix of component A1 comprises a styrene polymer and makes up from 60 to 95% by weight, preferably 80 to 95% by weight, based on the component A. A suitable monomer for the resin matrix is, in particular, styrene. However, it is also possible to use α-methylstyrene or p-methylstyrene or mixtures of substituted styrenes, but the exclusive use of styrene is preferred, and the resin matrix thus preferably comprises polystyrene.

The resin matrix is produced in a manner known per se during the production of component A by polymerizing, thermally or by means of free radicals, the soft phase, ie. a rubber, for example, a polydiene or a linear two-block copolymer made from diene or mixtures together with the styrene monomers later making up the resin matrix. During this, graft copolymers of the rubber (soft phase) and ungrafted styrene polymers, the resin matrix, form.

The resin matrix can have a viscosity number $\eta_{sp}/c$ in the range from 50 to 140, in particular in the range from 70 to 120. This corresponds to mean molecular weights ($M_w$) in the range from 100,000 to 350,000, in particular from 150,000 to 300,000.

In the end, the soft phase is finely dispersed in the resin matrix. The way in which a soft phase can be dispersed in a resin matrix is known. The soft phase is present in the resin matrix in a proportion of from 5 to 40% by weight, preferably from 5 to 20% by weight, and has a mean particle size in the range from 0.01 to 10 $\mu$m, preferably in the range from 0.3 to 8 $\mu$m. In the particle size range mentioned, the mean particle size, determined by counting an electron photomicrograph, is thus a number average.

The soft phase is thus a graft copolymer comprising the monomer(s) of the resin matrix, ie. in particular styrene, on rubber or a mixture of rubbers, for example a mixture of an elastomeric, linear styrene-butadiene two-block copolymer and polybutadiene.

The preferred soft phase is polybutadiene and the graft copolymer thereof with styrene. Polybutadienes of the medium- or high-cis type having molecular weights in the range from 70,000 to 450,000 (weight average) are particularly suitable. Medium-cis-polybutadienes having molecular weights of from 300,000 to 400,000 are preferred.

Another highly suitable soft phase is a linear two-block copolymer or graft copolymer thereof with styrene.

Elastomeric, linear two-block copolymers are obtained by anionic polymerization with the aid of lithium initiators. Suitable vinyl-aromatic monomers for the first block are styrene and substituted styrenes. Specific examples are styrene, which is preferably used alone, and o-, m- and p-methylstyrene. The second block of the block copolymer preferably comprises only butadiene.

The two-block copolymer can have, for example, a block polystyrene content of from 40 to 90% by weight, based on the block copolymer (remainder in each case butadiene). The block copolymer mentioned has a so-called sharp transition. The preparation of block copolymers of this type is known, for example, from A. Echte, Angew. Makr. Chemie 58/59 (1977) 175. The block copolymer should have a mean molecular weight ($M_w$) of from 100,000 to 300,000, preferably of from 150,000 to 250,000.

If mixtures of polydienes and linear block copolymers are used as the rubber, the total polydiene content is calculated from the proportion, for example, of the polybutadiene and, for example, from the butadiene content of the two-block copolymer. This total polydiene content should be in the range from 2 to 30% by weight, preferably from 4 to 15% by weight, based on component A.

The following may serve as a practical example: a mixture of 8% by weight of styrene-butadiene two-block copolymer having a butadiene content of 50% by weight and 6% by weight of homopolybutadiene is used. The total polybutadiene content is then 8×0.5=4% by weight of polybutadiene from the two-block copolymer and 6% by weight from the butadiene homopolymer, so the total polybutadiene content is 10% by weight.

Impact resistant polystyrene resins prepared by the process described in DE-A-1,770,392 or those having particularly good stress cracking resistance (cf. DE-A-2,525,019) are particularly preferred. It is also possible to use impact resistant polystyrene having translucent properties, as described, for example, in DE-A-2,613,352.

However, it is of course also possible to use styrene-butadiene graft copolymers having a lower butadiene content, for example of less than 40% by weight, or finally pure styrene homopolymer. Usable heat-sealable compositions can then also be obtained through an increased proportion of styrene-butadiene block copolymer. However, this route is less economic.

The second constituent (independent of the above-mentioned soft phase) present in the specific component A of DE-A-3,531,036 is a block copolymer A2 comprising styrene and butadiene. This comprises at least one block of a vinyl-aromatic monomer, in particular from the group comprising styrene, α-methylstyrene, ring-alkylated styrene, such as p-methylstyrene, or mixtures thereof, and at least one block comprising butadiene or isoprene or a mixture thereof.

The block copolymer may comprise 2 or 3 blocks, and may be linear or branched. Examples of suitable products and processes for its preparation are described in: DE-A-1,084,919, DE-A-1,645,406, DE-A-1,420,698 and U.S. Pat. No. 3,030,364. Branched products are disclosed in DE-A-1,934,348, DE-A-1,959,922 and DE-A-2,550,227.

Processes for the preparation of branched block copolymers are also described in the publications mentioned and in DE-A-3,248,746.

Styrene-isoprene block copolymers having a sharp or indistinct transition are preferred.

The styrene-isoprene block copolymer here may be any block copolymer, with no limitation on its structure, which is obtained by (so-called anionic) solution polymerization using an alkyl lithium compound as catalyst. Both elastomeric styrene-butadiene and styrene-isoprene block copolymers and the resinous styrene-butadiene and styrene-isoprene block copolymers having a diene content of 50% by weight can be used. If elastomeric styrene-diene block copolymers having a diene content of greater than 50% by weight are used, their proportion in the mixture is preferably from 20 to 40% by weight, but may be higher or lower, as required.

Resinous styrene-diene block copolymers A2 having styrene contents of greater than 50% by weight, in particular from 65 to 95% by weight, should preferably be present in component A according to the invention in an amount of from 40 to 60% by weight.

The third constituent of the specific component A is a lubricant (component A3). Suitable lubricants are in principle all low-molecular-weight substances which are compatible, in the amount required, with components A1 and A2 in the molding composition. These include, for example, mineral oils, aromatic or aliphatic alcohols or esters, such as dodecyl alcohol, butyl stearate, diethyl hexaphthalate, etc.

Further specific examples are ethylene oxide/propylene oxide block copolymers; microhard waxes; ethylene-bisstearylamide (Acrawax); metal soaps, in particular of the alkaline earth metals and of zinc; mineral oils based on, in particular, naphthenic and paraffinic hydrocarbons (in particular the technical grade and medical white oils); and silicone oils having viscosities in the range of from 0.5 to 50,000 mPas.

Further constituents of component A are customary additives, for example release agents, antistatics, antioxidants, pigments or fillers.

Component B

Component B, used if required, of the heat-sealable plastic film according to the invention should be regarded as a base or base film. Suitable base films are in principle all thermoplastics based on styrene and butadiene, ie. impact resistant polystyrene, styrene-butadiene block copolymers, and mixtures of styrene homopolymers or styrene-butadiene graft copolymers with styrene-butadiene block polymers. The heat-sealable layer adheres to these substances without an adhesive. Examples of other suitable thermoplastics are copolymers of styrene with acrylonitrile or acrylonitrile and butadiene, and olefin polymers or polymers of esters or amides. In these cases, however, it may be necessary to bond the heat-sealable layer to the base film using an appropriate adhesive or adhesion promoter.

Component B of the heat-sealable plastic film according to the invention is preferably a high impact strength polystyrene resin comprising a resin matrix and an elastomeric soft phase.

In this case, the resin matrix comprises the polymer of a monovinyl-aromatic monomer, and makes up from 60 to 95% by weight, preferably from 70 to 90% by weight, based on component B. The monovinyl-aromatic monomer used is in particular styrene, but substituted styrenes or copolymers of styrene with other suitable monomers, such as maleic anhydride or methyl methacrylate, can also be used as the resin matrix.

The corresponding soft phase of component B finely dispersed in the resin matrix in the conventional manner and makes up from 5 to 40% by weight, preferably from 8 to 20% by weight, based on B, of the resin matrix. It has, for example, a mean particle size in the range from 0.3 to 10 μm.

The soft phase is a graft copolymer of the monomer(s) of the resin matrix, ie. in particular, of styrene, on a rubber or a mixture of rubbers; the rubber may, for example, be a mixture of an elastomeric, linear styrene-butadiene two-block copolymer of the A-B type and polybutadiene.

An example of a preferred soft phase is polybutadiene or a graft copolymer thereof, preferably with styrene. The graft base is generally a polymer having from 4 to 5 carbon atoms; in particular, polybutadiene of the medium- or high-cis type having a molecular weight in the range from 70,000 to 450,000 (weight average) is suitable. Medium-cis-polybutadiene having a molecular weight of from 300,000 to 400,000 is preferred.

The soft phase used may also be a styrene-butadiene block copolymer. This can be employed alone or in addition to the graft copolymer. Examples are two-block copolymers A-B comprising a styrene block A and a polybutadiene block B. The two-block copolymer may, for example, have a block styrene content of from 30 to 90% by weight, and the remainder is butadiene.

If a mixture of polydiene and a linear block copolymer is used, the polydiene represents the entire amount of, for example, polybutadiene and, for example, the butadiene content in the two-block copolymer. The total amount of polydiene should be in the range from 4 to 40%, preferably from 4 to 20%, by weight, based on component B.

Component B is particularly preferably impact resistant polystyrene prepared by the process described in German Published Application DE-AS 1,770,392.

Component C

Component C should have a high melting point and prevent adhesion of the heat-sealable films to the sealer head. However, component C of the plastic films replaces not only a protective coating, but also increases, in a surprising manner, the processing latitude of the heat-sealable plastic film to such an extent that the base layer is prevented from running off, even at very high sealing temperatures and very long sealing times, and interruption-free processing and problem-free use of the heat-sealing films is thus made possible for the first time. All thermoplastics whose melting point or softening range is above 200° C., preferably above 230° C., are suitable as component C of the heat-sealable plastic films according to the invention. Thus, for example, the plastics listed in the table below are suitable as component C.

| Plastic, conventional name | Chemical composition | Melting point |
|---|---|---|
| Nylon 6 | Polycaprolactam | 220 |
| Nylon 6,6 | Polyhexamethylene-adipamide | 255 |
| Nylon copolymerized with butylene terephthalate | Base hexamethylene-diamine, caprolactam, terephthalic acid | 298 |
| Polybutylene terephthalate | Condensate made from terephthalic acid or dimethylphthalic acid and 1,4-butanediol | 220 to 225 |

The following may also be mentioned: polyphenylene oxide and mixtures thereof with polystyrene, polysulfones, polyether sulfones, polyether ketones, LC polymers, polyether imides, crystalline polyethylene terephthalate, polyphenylene sulfide, polyamide imide copolymers or polyamides having the structure of Nylon 6,12 (polyhexamethylene dodecamide), 11 (poly-ω-aminoundecanoic acid), 4.6 (polytetramethylene adipamide) etc., so long as the melting point or softening range is above 200° C.

Component D

Depending on the type of components B and C, an adhesive or adhesion promoter, preferably thermoplastic, may be necessary to provide a strong bond between the individual layers of the 3 components A, B and C. Experience has shown that adhesion promoters are not necessary for bonding A to B if component B is a styrene-butadiene polymer containing less than 15% of other comonomers. For bonding component A to polyolefins, ethylene-vinyl acetate copolymers having a vinyl acetate content of greater than 10 % or styrene-butadiene block copolymers predominantly comprising butadiene have otherwise proven suitable. Component A can be bonded to polyamide using styrene-maleic anhydride copolymers or to polyesters, such as polyethylene terephthalate and polybutylene terephthalate, using styrene-butadiene block copolymers.

Component D of the heat-sealable plastic film according to the invention may also be, for example, a further layer of a thermoplastic having high gas- and/or steam-impermeability incorporated as a gas or steam barrier. This layer protects the contents, for example, from drying out or from the effects of oxygen. Examples are layers of ethylene-vinyl alcohol copolymers which have high gas impermeability or layers of thermoplastic PVDC copolymers having high gas and steam impermeability, etc. If necessary, a layer of this type should likewise be bonded to the adjacent components using a suitable adhesion promoter.

Component D may also be a substantially opaque or otherwise colored layer which protects the contents, for example, against the effects of light. To this end, suitable pigments, preferably carbon black or mixtures of carbon black with titanium dioxide or further pigments, are added to a material, for example of components B or C, and an additional pigmented layer is introduced; this facilitates adhesion without adhesion promoters.

Finally, it is possible to use a further component D comprising, for example, layers having an anti-electrostatic finish, layers having improved printability or improved scratch resistance, layers having high impact resistance, etc.

The heat-sealable plastic film according to the invention is preferably produced by coextrusion. This process is known. Coextrusion can be carried out at bulk temperatures of from around 170° C. to 350° C. The individual components A-D are melted in different extruders and either combined in multiple flat film dies or annular dies or the layer(s) is(are) combined in an adapter.

It is also possible to apply one or more layers onto the other extruded layer(s) by lamination.

During extrusion, the thickness of the individual layers can be matched to the requirements on the finished films, for example, by varying the extruder speed.

Use of the Heat-Sealable Plastic Film

The heat-sealable films produced in this way are sealed onto containers made of styrene polymers, for example styrene homopolymers, styrene-butadiene graft polymers or block copolymers, or mixtures of these substances, on conventional sealers used for heat sealing. The containers may also comprise other styrene polymers, for example those containing a certain proportion of copolymers such as acrylonitrile. Multilayer films are very frequently used for packages. These are also suitable for sealing using these heat-sealable plastic films, with the proviso that the inner layer onto which the lid is sealed comprises a styrene polymer which can be heat-sealed against component A of the heat-sealable film.

For a prespecified shape of the sealing head, the sealing conditions are described by means of temperature of the sealing head, the pressure during sealing and the sealing time. Due to the low thermal conductivity of the heat-sealable plastic film compared with aluminum foils, the sealing conditions are highly dependent on the thickness of the heat-sealable plastic films. For example, a satisfactory sealing can be achieved for a 0.1 mm thick film in only 0.2 to 0.3 second at a sealing temperature of 200° C. and a sealing pressure of 2 bar, whereas a sealing time of 0.8 to 1 second is required under the same conditions for a 0.25 mm thick film.

Depending on the type of component C of the heat-sealable plastic film, suitable sealing conditions are a pressure of from 1 to 5 bar, a sealing temperature of from 140° C. to 280° C. and a sealing time of from 0.1 to 2 seconds.

EXAMPLE 1

A heat-sealable plastic film is produced from the following components by coextrusion.

Component A: heat-sealable layer corresponding to the mixture used in the examples of German Laid-Open Application DE-OS 3,531,036.

Component B: high impact strength polystyrene containing 8% of butadiene (Vicat softening point 95° C. (DIN 53 460, method A), melt flow index 3 g/10 min in accordance with DIN 53 735, 200° C./5 kg) blended with 15% of a styrene-butadiene two-block copolymer containing 72% of butadiene.

Component C: nylon 6.6, melting point 260° C., determined in accordance with ISO 1218, method A.

Component D: copolymer comprising 80% of ethylene, 10% of vinyl acetate and 10% of maleic anhydride, for use as an adhesion promoter between layers B and C.

Component B is fed to a main extruder, and components A, C and D are fed to a multiple flat film die, each through an ancillary extruder. The processing temperatures for the molding compositions were:

Component A: 189° C.; component B: 210° C.; component C: 280° C.;

Component D: 240° C.; and the layer structure of the film was as follows:

Component A: 0.01 mm; component B: 0.23 mm; component C: 0.02 mm;
Component D: 0.0 1 mm.

EXAMPLES 2 TO 12

Examples 2 to 12 were produced in the same equipment and can be summarized in tabular form (Table 1). Component A was the material of Example 1.

| Example | Component A | Component B | Component C | Component D |
|---|---|---|---|---|
| 2 | 0.01 mm | 0.02 mm high impact strength polystyrene (as in Ex. 1) | 0.01 mm co-polymer comprising 80% of ethylene and 20% of vinyl acetate | 0.03 mm Nylon 6,6 |
| 3 | 0.015 mm | 0.23 mm high impact strength polystyrene (corresponding to Ex. 1) | 0.013 mm co-polymer comprising 80% ethylene, 10% vinyl acetate and 10% of maleic anhydride | 0.03 mm Nylon 6,6 |
| 4 | 0.01 mm | 0.08 mm high strength polystyrene (corresponding to Ex. 1) | As for Ex. 3 | 0.015 mm Nylon 6,6 |
| 5 | 0.01 mm | 0.08 mm high impact strength polystyrene (corresponding to Ex. 1) | As for Ex. 3 | 0.01 mm Nylon co-polymer, melting point 298° C. |
| 6 | 0.01 mm | 0.2 mm high impact strength polystyrene (corresponding to Ex. 1) | 0.012 mm styrene-butadiene block co-polymer containing 30% of butadiene | 0.02 mm polybutylene terephthalate, m.p. 225° C. |
| 7 | 0.01 mm | 0.08 mm high impact strength polystyrene (corresponding to Ex. 1) | As for Ex. 6 | As for Ex. 6 |
| 8 | 0.01 mm | 0.25 mm high impact strength polystyrene | As for Ex. 3 | 0.02 mm Nylon copolymer, m.p. 298° C. |
| 9 | 0.01 mm | As for Ex. 8 | As for Ex. 8 | 0.03 mm Nylon 6 |
| 10 | 0.01 mm | No layer B | As for Ex. 8 | 0.06 mm Nylon 6,6 |
| 11 | 0.01 mm | No layer B | As for Ex. 3 | 0.04 mm nylon copolymer, m.p. 298° C. |
| 12 | 0.01 mm | No layer B | As for Ex. 6 | 0.06 mm polybutylene terephthalate |
| Comparison experiments | | | | |
| 13 | 0.02 mm | 0.24 mm as for Ex. 1 | Standard commercial overcoating with protective coating | |
| 14 | 0.015 mm | 0.11 mm as for Ex. 1 | Standard commercial overcoating with protective coating | |
| 15 | 0.04 mm thick aluminum foil with acrylate-based heat-sealable coating | | | |
| 16 | 0.1 mm thick PVC film with acrylate-based heat-sealable coating and commercially available protective coating | | | |
| 17 | 0.23 mm thick PVC film with acrylate-based heat-sealable coating and commercially available protective coating | | | |

Heat-sealing experiments were carried out using the heat-sealable plastic films produced as described in Examples 1 to 12. Some of the heat-sealable films produced as described in Examples 1 to 12 were additionally coated with a heat-resistant coating (in each case variant a), and in comparison experiments 13 and 14, heat-sealable plastic films corresponding to DE-A-3,531,036, ie. without components C and D according to the invention, but with a heat-resistant coating, were used. In addition, commercially available aluminum heat-sealable foils (Example 15) and commercially available PVC heat-sealable films (Examples 16 and 17) were included in the comparison experiments. Each of these was also coated with a protective coating and with an acrylate-based heat-sealable coating.

The parameters given in the examples and comparison experiments were determined as follows:

1. Sealing conditions with the sealing head adjusted differently with respect to temperature (°C.), pressure (bar) and time (sec). The films were heat-sealed onto commercially available thermoformed packaging pots made from impact resistant polystyrene, butadiene content 6%, Vicat softening point 90° C. (DIN 53 460 method A), melt flow index 4 g/10 min (MFI: 200° C./5 in accordance with DIN 53 735).

2. Determination of the bursting pressure

Packaging pots were sealed under various sealing conditions. In order to determine the strength of the seal bond, a bursting pressure test was carried out. To this end, a measurable excess pressure was produced in the sealed container by means of compressed air using suitable equipment. The apparatus essentially comprises a manometer with trailing pointer and a compressed air line connected to an aperture in the pot by means of a rubber seal. The pressure was increased until the seal weld opened. The maximum pressure achieved is referred to as the bursting pressure.

3. Determination of the drop height

Packaging pots of standardized dimensions were filled with water and heat-sealed under various conditions. The maximum drop height in cm before the seal bursts was determined.

4. Determination of the peel strength from the pot

Packaging pots were heat-sealed under various conditions, and the peel strength of the heat-sealable film from the pot was determined using a specially designed apparatus. To this end, the pots were clamped onto the stage of a universal pressure and tensile testing machine. A projecting corner of the heat-sealed lid was held and connected to the upper clamp jaw of the testing machine via an extension.

The force was built up at a load rate of 10 mm/mm and the lid peeled off. The force in [N] before the first tear and the tear propagation force on the seal weld in the center of the lid were determined.

TABLE 2

| Example | Sealing conditions | | | Residual thickness of the heat-sealable film at the seal edge [% of initial value] | Bursting pressure [bar] | Drop height [cm] | Peel strength | |
|---|---|---|---|---|---|---|---|---|
| | Temperature [°C.] | Pressure [bar] | Time [sec] | | | | Force before 1st tear [N] | Tear propagation force in the center of the lid [N] |
| 1 | 200 | 2 | 1 | 85 | 1.55 | 110 | 18.2 | 2.2 |
| 1 | 220 | 2 | 1 | 84 | 1.61 | 108 | 20.5 | 2.4 |
| 1 | 240 | 2 | 0.8 | 80 | 1.67 | 115 | 22.3 | 2.5 |
| 1a | 250 | 2 | 0.8 | 78 | 1.51 | 96 | 24.5 | 2.7 |
| 2 | 200 | 2 | 1 | 87 | 1.52 | 105 | 17.3 | 1.9 |
| 2 | 220 | 2 | 1 | 86 | 1.57 | 115 | 21.4 | 2.3 |
| 2 | 240 | 2 | 0.8 | 82 | 1.68 | 109 | 21.8 | 2.5 |
| 2a | 250 | 2 | 0.8 | 80 | 1.70 | 112 | 23.6 | 2.8 |
| 3 | 200 | 2 | 1 | 80 | 1.71 | 104 | 19.1 | 1.9 |
| 3 | 220 | 2 | 1 | 45 | 1.42 | 106 | 16.2 | 1.8 |
| 3a | 240 | 2 | 0.8 | 10 | 1.1 | 40 | 4.8 | <0.5 |
| 4 | 200 | 2 | 0.3 | 87 | 1.72 | 103 | 19.5 | 2.4 |
| 4 | 220 | 2 | 0.3 | 85 | 1.74 | 105 | 17.6 | 2.7 |
| 4 | 240 | 2 | 0.3 | 81 | 1.58 | 107 | 21.3 | 3.1 |
| 4a | 250 | 2 | 0.3 | 79 | 1.68 | 102 | 24.4 | 3.3 |
| 5 | 200 | 2 | 0.3 | 88 | 1.68 | 98 | 17.9 | 2.1 |
| 5 | 240 | 2 | 0.3 | 88 | 1.69 | 101 | 23.3 | 2.4 |
| 5 | 260 | 2 | 0.2 | 85 | 1.75 | 102 | 19.4 | 2.8 |
| 5 | 280 | 2 | 0.2 | 80 | 1.70 | 98 | 21.3 | 3.1 |
| 5a | 290 | 2 | 0.2 | 75 | 1.61 | 105 | 24.3 | 3.5 |
| 6 | 200 | 2 | 1 | 85 | 1.61 | 100 | 21.3 | 2.2 |
| 6 | 220 | 2 | 1 | 80 | 1.68 | 89 | 20.0 | 2.3 |
| 6a | 240 | 2 | 0.8 | 15 | 1.09 | 15 | 3.2 | <0.5 |
| 7 | 200 | 2 | 0.3 | 88 | 1.72 | 98 | 22.9 | 1.8 |
| 7 | 220 | 2 | 0.3 | 80 | 1.76 | 110 | 24.7 | 2.1 |
| 7a | 240 | 2 | 0.3 | 12 | 1.21 | 24 | 7.8 | <0.5 |
| 8 | 200 | 2 | 1 | 88 | 1.68 | 105 | 20.1 | 2.1 |
| 8 | 240 | 2 | 0.8 | 87 | 1.72 | 107 | 21.1 | 2.3 |
| 8 | 260 | 2 | 0.6 | 84 | 1.81 | 109 | 23.3 | 2.4 |
| 8 | 280 | 2 | 0.6 | 77 | 1.82 | 111 | 26.8 | 2.7 |
| 8a | 290 | 2 | 0.5 | 75 | 1.82 | 103 | 25.7 | 3.6 |
| 9 | 200 | 2 | 1 | 82 | 1.68 | 107 | 22.6 | 2.9 |
| 9 | 220 | 2 | 1 | 79 | 1.65 | 104 | 21.8 | 3.2 |
| 9a | 240 | 2 | 0.8 | 18 | 1.17 | 21 | 4.2 | 0.5 |
| 10 | 200 | 2 | 0.2 | 91 | 1.63 | 102 | 23.3 | 2.2 |
| 10 | 220 | 2 | 0.2 | 89 | 1.68 | 100 | 22.3 | 2.5 |
| 10 | 240 | 2 | 0.2 | 88 | 1.72 | 112 | 24.1 | 3.0 |
| 10a | 250 | 2 | 0.2 | 86 | 1.85 | 116 | 27.2 | 3.3 |
| 11 | 200 | 2 | 0.2 | 93 | 1.70 | 103 | 24.1 | 2.5 |
| 11 | 240 | 2 | 0.2 | 93 | 1.75 | 98 | 25.2 | 2.7 |
| 11 | 260 | 2 | 0.2 | 91 | 1.73 | 108 | 25.5 | 3.5 |
| 11 | 280 | 2 | 0.2 | 90 | 1.81 | 109 | 28.1 | 3.9 |
| 11a | 290 | 2 | 0.2 | 85 | 1.91 | 116 | 30.1 | 4.5 |
| 12 | 200 | 2 | 0.3 | 90 | 1.65 | 100 | 22.7 | 2.5 |
| 12 | 220 | 2 | 0.3 | 85 | 1.70 | 97 | 23.5 | 2.9 |
| 12a | 240 | 2 | 0.3 | 10 | <1.1 | <10 | 2.4 | <0.5 |
| 13 | 200 | 2 | 1 | 72 | 1.71 | 105 | 24.3 | 2.1 |
| 13 | 220 | 2 | 1 | 45 | 1.75 | 110 | 24.2 | 2.5 |
| 13 | 240 | 2 | 0.8 | 12 | <1.1 | <10 | 3.8 | <0.5 |
| 14 | 200 | 2 | 0.3 | 68 | 1.70 | 103 | 20.2 | 2.4 |
| 14 | 220 | 2 | 0.3 | 42 | 1.60 | 98 | 18.3 | 2.4 |
| 14 | 240 | 2 | 0.3 | 14 | <1.1 | <10 | 2.7 | <0.5 |
| 15 | 220 | 2 | 0.2 | 98 | 1.51 | 87 | 27.2 | 3.2 |
| 15 | 240 | 2 | 0.2 | 98 | 1.48 | 95 | 26.3 | 3.2 |
| 15 | 260 | 2 | 0.2 | 98 | 1.55 | 103 | 29.5 | 3.5 |
| 15 | 280 | 2 | 0.2 | 98 | 1.60 | 105 | 30.0 | 3.7 |
| 16 | 200 | 2 | 0.3 | 91 | 1.43 | 75 | 17.2 | 0.8 |

TABLE 2-continued

| | Sealing conditions | | | Residual thickness of the heat-sealable film at the seal edge [% of initial value] | Bursting pressure [bar] | Drop height [cm] | Peel strength | |
|---|---|---|---|---|---|---|---|---|
| | | | | | | | Force before 1st tear [N] | Tear propagation force in the center of the lid [N] |
| Example | Temperature [°C.] | Pressure [bar] | Time [sec] | | | | | |
| 16 | 220 | 2 | 0.3 | 78 | 1.45 | 80 | 16.5 | 0.9 |
| 16 | 240 | 2 | 0.3 | 46 | 1.28 | 29 | 9.7 | 0.8 |
| 17 | 200 | 2 | 1.0 | 92 | 1.39 | 74 | 12.5 | 0.6 |
| 17 | 220 | 2 | 1.0 | 75 | 1.42 | 70 | 16.3 | 0.9 |
| 17 | 240 | 2 | 0.8 | 45 | 1.21 | 32 | 10.1 | 0.8 |
| 18 | 200 | 2 | 1.0 | 85 | 1.28 | 58 | 12.4 | 0.5 |
| 18 | 220 | 2 | 1.0 | 65 | 1.31 | 64 | 16.4 | 0.7 |
| 18 | 240 | 2 | 0.8 | 32 | 1.30 | 20 | <10 | 0.7 |

We claim:

1. A heat-sealable plastic film produced by extrusion or lamination, comprising:

a layer A of a heat-sealable mixture of three components $A_1$, $A_2$ and $A_3$, wherein component $A_1$ is an impact resistant polystyrene consisting of a styrene polymer resin matrix and a phase which is a graft copolymer of styrene and a rubber selected from the group consisting of polybutadiene; an elastomeric linear styrene-butadiene two-block copolymer and mixtures thereof, component $A_2$ is a styrene-butadiene or styrene-isoprene block copolymer, and component $A_3$ is a lubricant;

a layer B of an impact resistant polystyrene resin consisting of from 60 to 95% by weight of a polymer selected from the group consisting of polystyrene, homopolymer of substituted styrene, copolymer of styrene and maleic anhydride, and copolymer of styrene and methylmethacrylate and from 5 to 40% by weight of an elastomeric particulate phase of polybutadiene, styrene grafted onto polybutadiene, styrene-butadiene two-block copolymer or styrene grafted onto linear styrene-butadiene two-block copolymer; and a layer C of a high-melting plastic film selected from the group consisting of polycaprolactam, polyhexamethylene adipamide, copolyamide of caprolactam, hexamethylenediamine and terephthalic acid and polybutylene terephthalate.

2. The plastic film of claim 1, which further comprises a layer D consisting of either a copolymer of styrene and maleic anhydride or a block copolymer of styrene and butadiene which is located between layers A and B, between layer B and layer C, or between layers A and B and C.

3. The plastic film of claim 1, wherein said film is constituted of from 3–30% of said layer of Component A, from 8–9% of said layer of Component B, and from 3–20% of said layer of Component C, each percentage based on the total weight or thickness of the plastic film.

* * * * *